United States Patent
Olier et al.

(10) Patent No.: US 6,944,401 B2
(45) Date of Patent: Sep. 13, 2005

(54) GAIN EQUALIZATION IN DWDM NETWORKS

(75) Inventors: Albert Olier, Rishon Le-Zion (IL); Hanni Inbar, Holon (IL); Oded Mor, Shoam (IL); David Abraham, Tel-Aviv (IL)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/258,511

(22) PCT Filed: Apr. 24, 2001

(86) PCT No.: PCT/US01/13121

§ 371 (c)(1),
(2), (4) Date: Oct. 24, 2002

(87) PCT Pub. No.: WO01/82516

PCT Pub. Date: Nov. 1, 2001

(65) Prior Publication Data

US 2003/0223747 A1 Dec. 4, 2003

Related U.S. Application Data

(60) Provisional application No. 60/199,145, filed on Apr. 24, 2000.

(51) Int. Cl.⁷ .................................................. H04J 14/02
(52) U.S. Cl. ............................. 398/94; 398/83; 398/25; 398/38
(58) Field of Search ..................... 398/93, 94, 25, 398/37, 38, 83, 84, 85, 177

(56) References Cited

U.S. PATENT DOCUMENTS

| | | | |
|---|---|---|---|
| 5,225,922 A | 7/1993 | Chraplyvy et al. | 359/124 |
| 5,461,497 A | 10/1995 | Machichan | 359/177 |
| 5,675,432 A | 10/1997 | Kosaka | 359/341 |
| 5,875,045 A * | 2/1999 | Sugiyama et al. | 398/94 |
| 5,963,361 A | 10/1999 | Taylor et al. | 359/337 |
| 5,986,782 A | 11/1999 | Alexander et al. | 359/110 |
| 6,040,933 A | 3/2000 | Khaleghi et al. | 359/124 |
| 6,115,157 A | 9/2000 | Barnard et al. | 359/124 |
| 6,134,036 A | 10/2000 | Androzzi et al. | 359/127 |
| 6,147,785 A * | 11/2000 | Mizrahi | 398/83 |
| 6,163,399 A | 12/2000 | Berg | 359/341 |
| 6,219,162 B1 | 4/2001 | Barnard et al. | 359/124 |
| 6,236,449 B1 | 5/2001 | Tanitsu | 359/341 |
| 6,509,986 B1 * | 1/2003 | Mizrahi | 398/83 |

FOREIGN PATENT DOCUMENTS

| | | | | |
|---|---|---|---|---|
| JP | 4056431 | 2/1992 | ........... | H04B/10/04 |
| JP | 4151918 | 5/1992 | ........... | H04B/10/04 |

* cited by examiner

Primary Examiner—M. R. Sedighian
Assistant Examiner—Christina Y Leung

(57) ABSTRACT

A method of controlling a network (115) through which information is transmitted in channels ($\lambda_1, \lambda_2, \ldots \lambda_n$) among nodes includes: (a) providing at a node a device (108) for removing from the network (115) and replacing on the network (115) a selected one ($\lambda_i$) of the channels, the device (108) including a first input port from the network (115) to the node and a first output port from the node to the network (115); (b) taking a measure of the strength ($P_{\lambda iDROP}$) of the received channel ($\lambda_{iDROP}$); (c) regenerating the channel ($\lambda_{iIN}$); (d) adjusting (114) the strength ($P_{\lambda iADD}$) of the regenerated channel ($\lambda_{iIN}$) to approximate the strengths of the remaining channels (($\lambda_1, \lambda_2, \ldots \lambda_n$)–$\lambda_i$; and (e) combining the regenerated and strength-adjusted channel ($\lambda_{iADD}$) with the remaining channels (($\lambda_1, \lambda_2, \ldots \lambda_n$)–$\lambda_i$) at the output port. The method further or alternatively includes (f) calculating an average signal strength ($P_{AVERAGE}$) for each active channel; (g) establishing a target signal strength ($P_{iTARGET}$) for each channel; (h) determining a required change ($\Delta P_i$) in signal strength; and, (i) sending the node a message to adjust the strength of a signal coupled to the first output port.

49 Claims, 3 Drawing Sheets

GAIN EQUALIZATION IN DWDM NETWORKS

CROSS-REFERENCE TO RELATED APPLICATIONS

This application claims priority to U.S. Ser. No. 60/199,145, filed Apr. 24, 2000, the disclosure of which is hereby incorporated herein by reference.

FIELD OF THE INVENTION

This invention relates to networks. It is disclosed in the context of Dense Wavelength-Division Multiplexed (WDM) networks, but is believed to be useful in other applications as well.

BACKGROUND OF THE INVENTION

DWDM networks carry diverse types of traffic such as, for example, SONET, ATM, IP, and so on. These networks are capable of mixing different types of traffic in the same physical medium. A typical DWDM network includes an arbitrary number of nodes interconnected in a ring topology by a pair of optical fibers. Some of these nodes are regenerating interfaces, where the optical transmissions are converted to electrical signals, information from them is processed, the electrical signals are reconverted to optical signals, and the optical signals placed on the optical fibers again for circulation to other nodes.

The optical portion of a transmission network coupling two regenerating interfaces is known as the optical layer segment. A general overall description of a typical optical layer segment follows. The description is applicable for a variety of DWDM network topologies including: point-to-point DWDM networks with Wavelength Add/Drop Multiplexers (WADMs) along the optical path; single-hub, ring-based DWDM networks; and, multiple-hub, ring-based DWDM networks. In the case of single-hub, ring-based DWDM networks, the originating hub is also the terminating hub. In this case, the ring includes only one folded segment. In the case of multiple-hub, ring-based DWDM networks, "regeneration nodes" are dispersed along the ring. In this case, the ring is a concatenated series of two or more optical segments.

DISCLOSURE OF THE INVENTION

According to one aspect of the invention, a method is provided for controlling a network through which information is transmitted in channels among nodes. The method includes: (a) providing at a node a device for removing from the network and replacing on the network a selected one or more of the channels, the device including a first input port from the network to the node and a first output port from the node to the network; (b) taking a measure of the strength of the received channel; (c) regenerating the channel; (d) measuring the strength of the regenerated channel; (e) adjusting the strength of the regenerated channel to approximate the strengths of the remaining channels; and (f) combining the regenerated and strength-adjusted channel with the remaining channels at the output port.

Illustratively according to this aspect of the invention, providing the device includes providing a device whose effects on the strengths of the removed channel, the regenerated and strength-adjusted channel and the remaining channels approximate known values.

Further illustratively according to this aspect of the invention, providing the device includes providing on the device a second output port at which the removed channel is recovered and a second input port at which the regenerated and strength-adjusted channel is recombined with the remaining channels.

Additionally illustratively according to this aspect of the invention, adjusting the strength of the regenerated channel to approximate the strengths of the remaining channels includes coupling the regenerated channel to an input port of an attenuator including a third input port, a control port and a third output port, coupling the third output port to the second input port, and providing at the control port a signal based, at least in part, upon the measured strength of the regenerated channel.

According to another aspect of the invention, or additionally according to this aspect of the invention, the method further includes: (g) calculating an average signal strength for each active channel; (h) establishing a target signal strength for each channel; determining a required change in signal strength; and, sending the node a message to adjust the strength of a signal coupled to the first output port.

Illustratively according to this aspect of the invention, taking a measure of the strength of the received channel includes talking a measure of the received power.

Further illustratively according to this aspect of the invention, establishing a target signal strength for each channel includes establishing a target power for each channel.

Additionally illustratively according to this aspect of the invention, establishing a target power for each channel includes establishing a target power $P_{iTARGET}=P_i+\gamma(P_{AVERAGE}-P_i)$, $0.25 \leq \gamma \leq 0.75$.

Illustratively according to this aspect of the invention, determining a required change in signal strength includes determining a required change in signal power.

Further illustratively according to this aspect of the invention, sending a node a message to adjust its power level includes sending the node a message to adjust its signal power.

Additionally illustratively according to this aspect of the invention, determining a required change in signal power includes determining the required signal change in decibels.

Illustratively according to this aspect of the invention, sending a node a message to adjust its power level includes sending the node a message to adjust its optical signal power.

Further illustratively according to this aspect of the invention, determining a required change in signal strength includes determining a required change in optical signal power.

Illustratively according to this aspect of the invention, the method further including removing a channel from the determinations of elements (b), (g) and (h) and sending a node a message not to adjust its power level if the channel is not being received at a node.

Additionally illustratively according to this aspect of the invention, elements (b)–(e) are performed in a first time, and elements (g)–(j) are performed in a second time, the second time being longer than the first time.

According to another aspect of the invention, apparatus is provided for controlling a network through which information is transmitted in channels among nodes. The apparatus includes a first device for (a) removing from the network and replacing on the network a selected one of the channels, (b) taking a measure of the strength of the received channel, (c) regenerating the channel, (d) adjusting the strength of the regenerated channel to approximate the strengths of the remaining channels, and (e) combining the regenerated and strength-adjusted channel with the remaining channels at the output port. The first device is coupled to an input port from the network to the node and to an output port from the node to the network.

Illustratively according to this aspect of the invention, the first device includes a first device whose effects on the strengths of the removed channel, the regenerated and strength-adjusted channel and the remaining channels approximate known values.

Further illustratively according to this aspect of the invention, the first device includes a first device having a second output port at which the removed channel is recovered and a second input port at which the regenerated and strength-adjusted channel is recombined with the remaining channels.

Additionally illustratively according to this aspect of the invention, he apparatus includes an attenuator having a third input port, a control port and a third output port. The the regenerated channel is coupled to the third input port, the third output port is coupled to the second input port, and the control port is provided with a signal based upon the measured strength of the regenerated channel.

According to another aspect of the invention, or additionally according to this aspect of the invention, the apparatus further includes a second device for (f) calculating an average signal strength for each active channel, (g) establishing a target signal strength for each channel, (h) determining a required change in signal strength, and, (i) sending the node a message to adjust the strength of a signal coupled to the first output port.

Illustratively according to this aspect of the invention, the first device tales a measure of the received power.

Further illustratively according to this aspect of the invention, the second device establishes a target power for each channel.

Additionally illustratively according to this aspect of the invention, the second device establishes a target power $P_{iTARGET}=P_i+\gamma(P_{AVERAGE}-P_i)$, $0.25 \leq \gamma \leq 0.75$.

Illustratively according to this aspect of the invention, the second device determines a required change in signal power.

Further illustratively according to this aspect of the invention, the second device sends the node a message to adjust its signal power.

Additionally illustratively according to this aspect of the invention, the second device determines the required signal change in decibels.

Illustratively according to this aspect of the invention, the second device sends the node a message to adjust its optical signal power.

Further illustratively according to this aspect of the invention, the second device determines a required change in optical signal power.

Additionally illustratively according to this aspect of the invention, the second device removes a channel from the determinations of elements (b), (f) and (g) and sends a node a message not to adjust its power level if the channel is not being received by the second device.

Illustratively according to this aspect of the invention, the first device performs elements (b)–(d) in a first time, and the second device performs elements (f)–(i) in a second time longer than the first time.

BRIEF DESCRIPTION OF THE DRAWINGS

The invention may best be understood by referring to the following detailed description and accompanying drawings. In the drawings.

DETAILED DESCRIPTIONS OF ILLUSTRATIVE EMBODIMENTS

Figure 1:
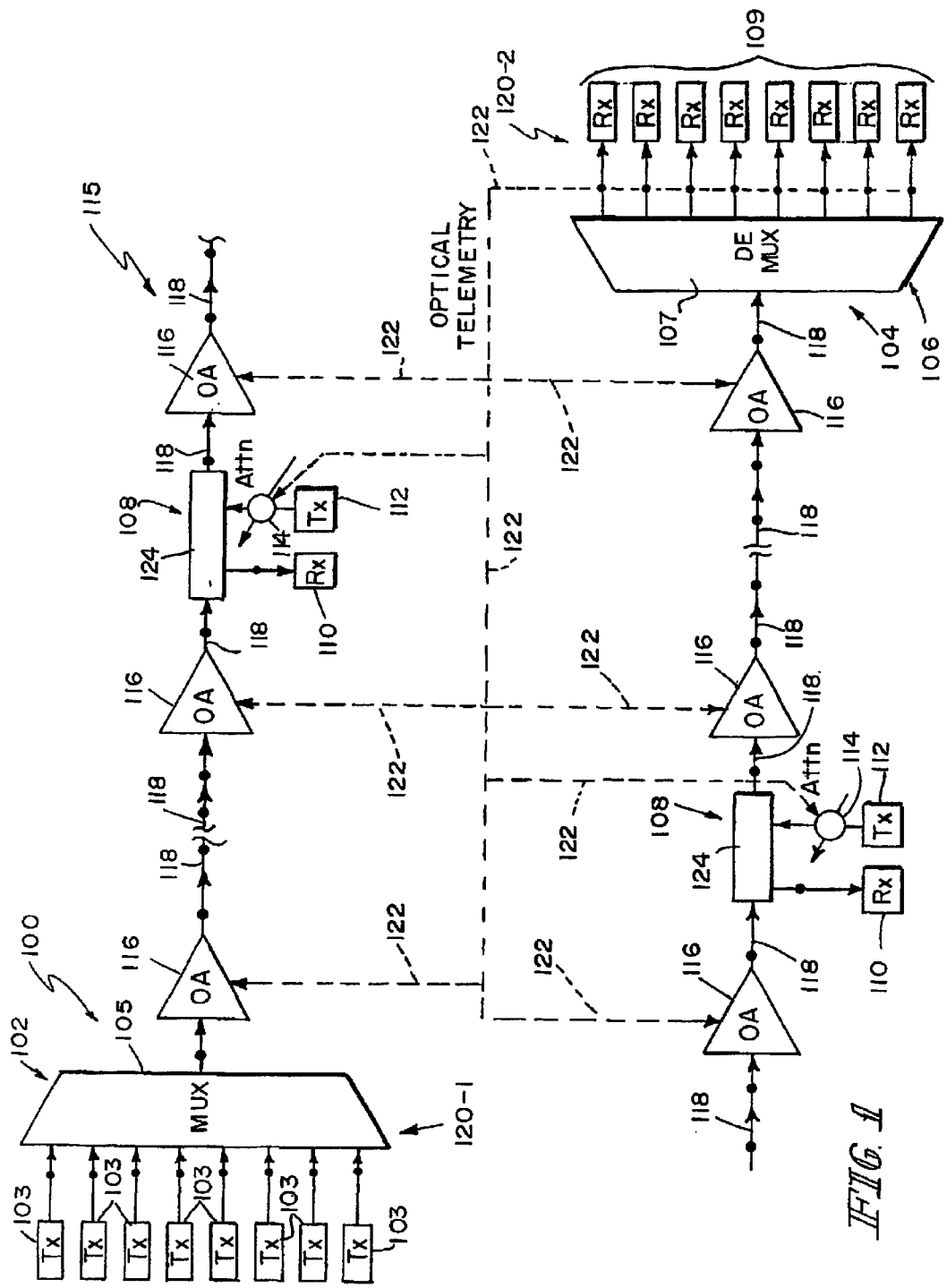
FIG. 1 illustrates a block diagram of an end-to-end optical layer segment incorporating the present invention.

Referring now generally to FIG. 1, an optical layer segment 115 includes the following six Optical Network Elements (ONEs): an optical channel multiplexer 100 at the transmitting termination 102 of the segment 115; an optical channel demultiplexer 104 at the receiving termination 106 of the segment 115; a WADM 108; an equalization protocol; (an) optical amplifier(s) 116; and, an optical fiber 118.

The first ONE is the optical channel multiplexer 100 at the transmitting termination 102 of the segment 115. The optical channel multiplexer 100 may or may not be used in conjunction with a post amplifier 116 to amplify its output signal. The optical channel multiplexer 100 includes optical transmitters 103, which generate the optical channels $\lambda_1, \lambda_2, \ldots \lambda_n$, and a multiplexer 105, which aggregates channels $\lambda_1, \lambda_2, \ldots \lambda_n$, onto optical fiber 118. The optical transmitters 103 each include a power level control mechanism, for example, an optical attenuator.

The second ONE is the optical channel demultiplexer 104 at the receiving termination 106 of the segment 115, with or without a preamplifier 116. The optical channel demultiplexer 104 includes a demultiplexer 107 which separates the optical channels $\lambda_1, \lambda_2, \ldots \lambda_n$, and optical receivers 109, which terminate the optical channels $\lambda_1, \lambda_2, \ldots \lambda_n$.

The third ONE is the WADM 108. One or more WADMs 108 may be placed along the optical network 115 between regenerating interfaces 100, 104. A WADM 108 isolates transmissions of a designated wavelength $\lambda_1$ to be dropped from the multiplexed transmission $\lambda_1, \lambda_2, \ldots \lambda_n$, but permits transmissions at other wavelengths $(\lambda_1, \lambda_2, \ldots \lambda_n)-\lambda_i$ to pass through, attenuated, but otherwise unaffected. The dropped transmissions $\lambda_{iDROP}$ on wavelength $\lambda_i$ are routed to an optical receiver 110, where they are detected and decoded. The WADM 108 also adds back to the through transmission $(\lambda_1, \lambda_2, \ldots \lambda_n)-\lambda_i$ whatever information is to proceed through the fiber away from the node 108 on the dropped, and now readded, wavelength $\lambda_{iADD}$. An optical transmitter 112, configured to transmit on the wavelength $\lambda_i$ that was dropped, illustratively provides the signal $\lambda_{iADD}$ to be added to an optical attenuator 114. $\lambda_{iADD}$ is multiplexed in WADM 108 with the through transmissions $(\lambda_1, \lambda_2, \ldots \lambda_n)-\lambda_i$. The attenuator 114 is configured so that its output power level $P_{\lambda iADD}$ (the power level of the added transmission) is equal to the power levels $(P_{\lambda 1}, P_{\lambda 2}, \ldots P_{\lambda n})-P_{\lambda iADD}$ of the through transmissions $(\lambda_1, \lambda_2, \ldots \lambda_n)-\lambda_i$ which, it must be remembered, were attenuated simply by passing through the WADM 108.

The fourth ONE is the equalization protocol, the algorithm by which performance of the network 115 is optimized. The equalization protocol optimizes signal power levels, or Optical Signal-to-Noise Ratio (OSNR) for each node 108. It also optimizes the performance of the entire network 115.

The fifth ONE is the optical amplifier 116. A plurality of optical amplifiers 116 typically are located along the network 115. Amplifiers 116 maintain the power budget along the network 115. Other ONEs may include optical preamplifiers 116 (see, for example, optical channel demultiplexer 104), optical post-amplifiers 116 (see, for example, optical channel multiplexer 100), or some combination of the two, all as previously noted. An optical amplifier 116 may also exist as a stand-alone element along the optical path. In practice, optical amplifiers 116 are deployed at designated locations along the network 115 according to the network 115 power budget.

The sixth ONE is the fiber 118 itself. The fiber 118 is the transmission medium between any other two ONEs. Because of the gain equalization mechanism discussed above, a fiber 118 may be of any suitable type(s), such as SMF, DSF, NZ-DSF, and so on.

Nodes which contain either optical multiplexers 100 or optical demultiplexers 104 are sometimes referred to as hub nodes 120. Specifically, a hub node containing an optical multiplexer 100 is referred to as a generating hub 120-1 and a hub node containing an optical demultiplexer 104 is referred to as a terminating hub 120-2.

A problem in optically amplified DWDM networks 115 is optimizing gain equalization for network 115 performance. Owing at least in part to the non-uniform spectral response of Erbium-Doped Fiber Amplifiers (EDFAs) 116, each optical channel $\lambda_1, \lambda_2, \ldots \lambda_n$ experiences a different optical gain. However, the distributed nature of DWDM networks 115, where WADMs 108 are distributed along the network 115, exacerbates the problem. In long-distance amplified systems, this can result in high Bit Error Rates (BERs) for some of the optical channels $\lambda_1, \lambda_2, \ldots \lambda_n$. There are at least two reasons for this. The first is the OSNR that arises from crosstalk between stronger and weaker channels $\lambda_1, \lambda_2, \ldots \lambda_n$. The second is an increase in the noise level due to Amplified Spontaneous Emissions (ASEs). It is therefore desirable to control and equalize either the optical powers or the OSNRs of the DWDM channels $\lambda_1, \lambda_2, \ldots \lambda_n$ in order to meet BER requirements. It is further desirable for this control and equalization to take place on a network 115 scale, for example, at detection planes.

The telemetry system of the present invention can perform at least the following three functions. First, the system can provide gain equalization of a channel $\lambda_{iADD}$ added by a WADM 108. Second, the system can adjust the gains of all optical amplifiers 116 in the system to an optimal level. Third, the system can transfers nodal messages between network 115 nodes. Each of these functions is described in detail below.

The method of the invention can be implemented as follows. Several laser transmitter 103 power control schemes could be exploited for the optical channel $\lambda_1, \lambda_2, \ldots \lambda_n$ power level control without any impact on the upper layer of the equalization protocol. Such schemes include direct control of laser driving current and wavelength stabilization, use of an optical attenuator, for example, using step-motor technology or the like, integrated devices with Mach-Zender interferometer-based attenuators for power control, and other technologies suitable for optical power level control. The only qualification on the transmitter 103 power control mechanism is that it be transparent to the gain equalization mechanism.

The power level control loop is based on the corrective message from the hub node 120-2 that a particular WADM 108 terminal i needs to set the power level of its added optical channel $\lambda_{iADD}$ appropriately. Detailed implementation is subject to the laser power level control technique that is used, and the desired performance. Automatic control can be implemented with hardware, for example, electronic circuitry, or by a software-based control loop, in order to obtain the desired performance. Again, implementation of the control strategy should be transparent to the equalization protocol.

The optical amplifier 116 AGC is based on a manual setting or a network 115 management system EMS) automatic command. Optical amplifiers 116 along the network 115 should set and maintain an appropriate gain level of the optical signal, regardless of its power level, that is, regardless of the number of active channels $\lambda_1, \lambda_2, \ldots \lambda_n$, the locations of the optical amplifiers 116 along the optical path, and so on.

The telemetry channel 122 provides network 115-level communication between the hub node 120 and the WADM 108 terminals along the network 115. The telemetry channel 122, or layer, thus permits transmission of any required measurements, reports, controls and commands necessary to support the gain equalization protocol. Implementation is a function of network 115 architecture and the types of communications transmitted. Options include an Optical Supervisory Channel (OSC) for inter-nodal communication. The format of the communication is a function of, among other things: the wavelength being used, for example, 1310 nm, 1510 nm, and so on; line rate, for example, 2 Megabits per second (Mb/s), 10 Mb/s, 155 Mb/s, and so on; and, higher layer protocols, such as, for example, ATM, TCP/IP, and the like; The telemetry channel 122 could also be carried over any virtual supervisory channels between the hub node 120-2 and the various WADM 108 terminals. These could be, for example, ATM VPI/VCI connections, SONET/SDH message-based data communication channels, TCP/IP messages, and so on, again, based upon the network 115 configuration. Whatever the network 115 configuration and protocols that are being used, for the gain equalization protocol, only parameters such as bandwidth, message delay, and the like, are of consequence in order for the telemetry communications channel 122 to meet its performance requirements.

Figure 2:
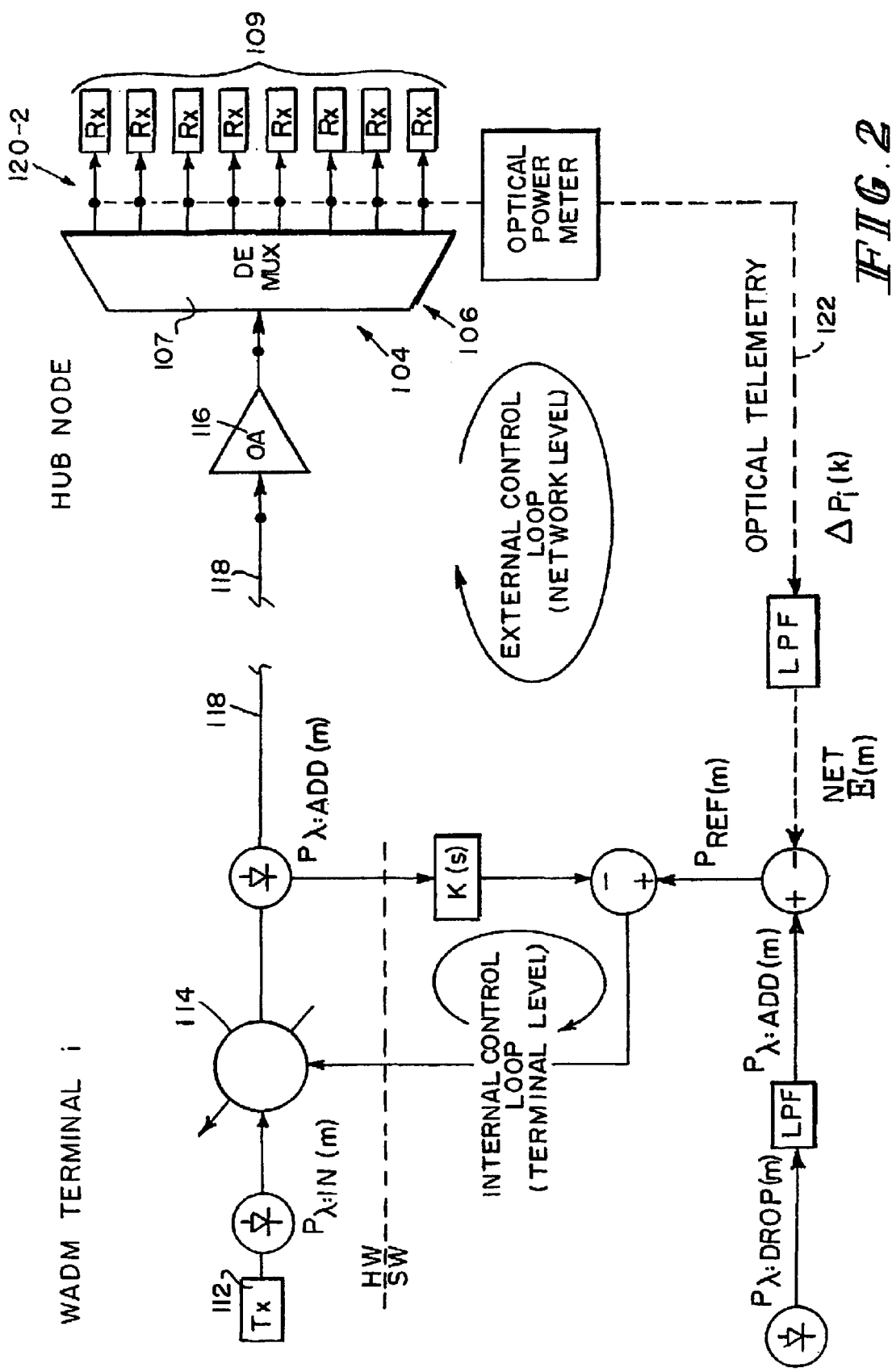
FIG. 2. illustrates an enlarged block diagram of a detail of the segment illustrated in FIG. 1; and, FIG. 3 illustrates an enlarged block diagram of a detail of the segment illustrated in FIG. 1.
Figure 3:
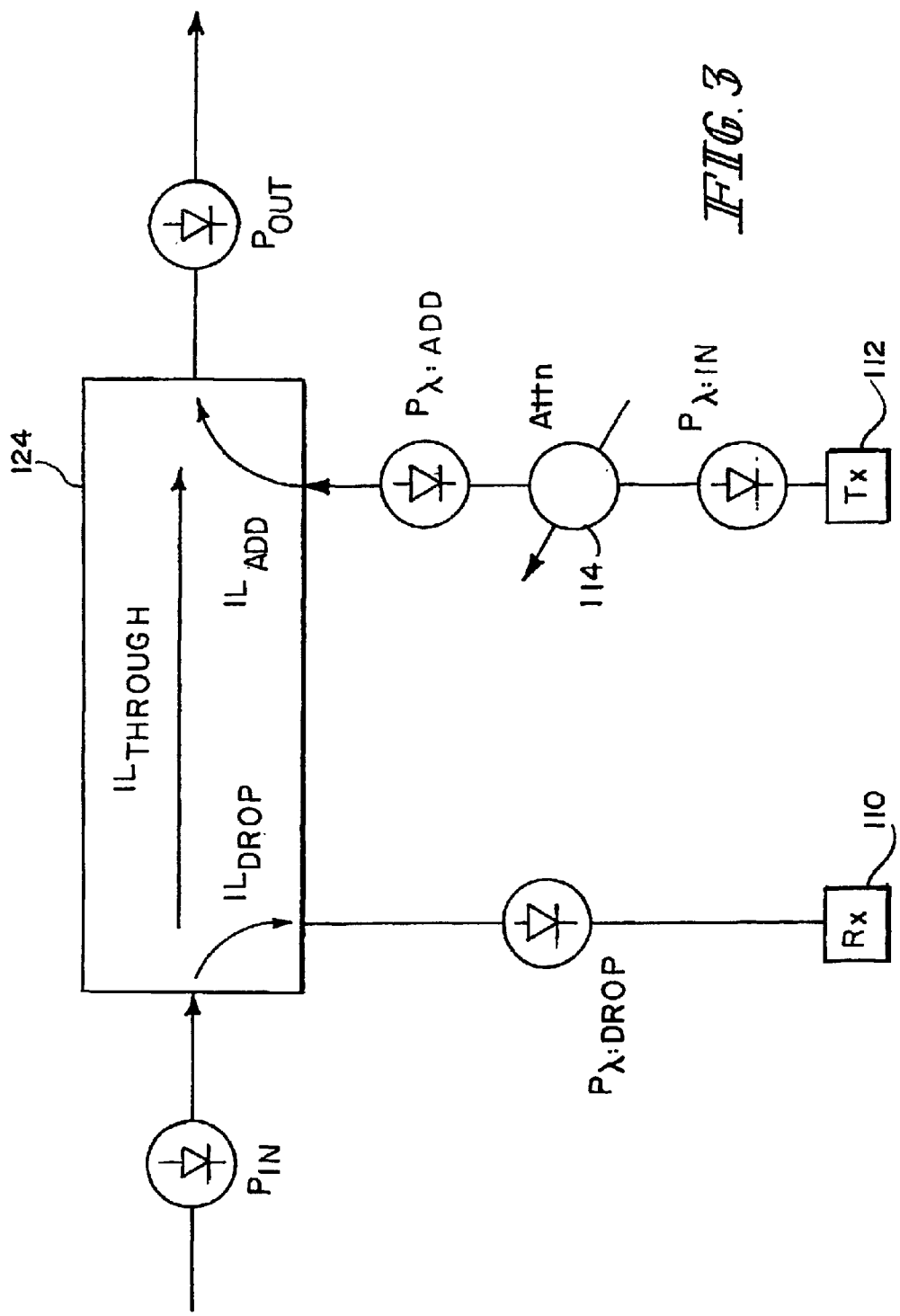

The general configuration of an illustrative gain equalization control loop at the network 115 level is illustrated in FIG. 2. The general configuration of an illustrative gain equalization control loop at the module 108 level is illustrated in FIG. 3. At the network 115 level, or external loop control level, the function of the hub node 120-2 is to measure the power level or OSNR of each received channel $\lambda_1, \lambda_2, \ldots \lambda_n$. Once the hub node 120-2 receives these measurements, it generates corrective messages and transmits these corrective messages to each terminal 108 in order to effect in that terminal 108 to which each specific corrective message is addressed an adjustment of that terminal 108's specific wavelength $\lambda_i$ power level with respect to the average power level within the network 115. It should be recognized that this control is not restricted to power level control alone, or to an implementation in hardware or software only.

The function of the telemetry system is to perform the optical measurement of the received power level or OSNR within the hub node 120-2 in order to monitor, indirectly, the received channel $\lambda_i$ quality. The hub node 120 performs the optical power or OSNR measurement on each DWDM channel $\lambda_1, \lambda_2, \ldots \lambda_n$, and compares that measurement to a defined target level. The result of each comparison is the generation of a correction message to the respective WADM 108 terminal. Each WADM 108 terminal receives its designated messages and adjusts the power level of the wavelength $\lambda_i$ that it drops and adds using an Automatic Power Control (APC) loop to control its optical attenuator 114.

The control scheme maintains average optical power in order to equalize received power levels. Importantly, the scheme permits other predefined target power levels to be set, manually or automatically, based on (an) other weighting function(s). The hub node 120-2's tasks within the scheme are to: measure received optical power $P_i$, at an input port of each applicable DWDM receiver 109; calculate average optical power per channel, $$P_{AVERAGE}=(1/N)\Sigma P_i, 1 \leq i \leq n,$$

over all active channels, that is, excluding inactive channels and those that have failed for whatever reason; set a new target power level for each channel, $$P_{iTARGET}=P_i+\gamma(P_{AVERAGE}-P_i),$$

wherein $\gamma$ is a convergence parameter having a value, for example, $0.25 \leq \gamma \leq 0.75$; calculate the change $\Delta P_i$ in optical power required, $$\Delta P_i=10 \times \log(P_{iTARGET}/P_i), \text{ in dB};$$

and, send each terminal 108 a message to adjust its power level by $\Delta P_i$ dB. As noted, in case of a failure, for example, an optical fiber cut, transmitter failure or the like, where there is no power on a specified channel $\lambda_i$, that channel will not be considered in the calculation and its $\Delta P_i$ message will be set to zero dB in order to maintain it at its level prior to its becoming inactive.

The WADM 108 terminal, illustrated schematically in FIG. 3, drops and adds a single channel, or wavelength, $\lambda_i$. WADM 108 terminal includes a passive optical element 124 and an optical attenuator 114. The optically dropped channel $\lambda_{iDROP}$ is terminated by an optical receiver 110, while the added channel $\lambda_{iADD}$ is regenerated by an optical transmitter 112. Although other schemes are equally workable, in the illustrative embodiment, the optical attenuator 114 is used to adjust the added channel $\lambda_i$'s power level $P_{\lambda iADD}$ to equalize it with the power levels of the passed-through channels ($\lambda_1$, $\lambda_2$, ... $\lambda_n$)–$\lambda_i$. During normal operation, equalization is performed independently at the module 108 level and at the network 115 level. Each module 108 activates an attenuator 114 control loop in an APC mode. Ignoring for purposes of explanation network 115 level control, the power level $P_{\lambda iADD}$ of the added channel $\lambda_{iADD}$ should be adjusted to the power level $P_{\lambda iDROP}$ of the dropped channel $\lambda_{iDROP}$ after digital low-pass filtering. That is:

$$\hat{P}_{\lambda iDROP}(m)=\alpha \times \hat{P}_{\lambda iDROP}(m-1)+(1-\alpha) \times P_{\lambda iDROP}(m); 0<\alpha<1$$

$$\hat{P}_{\lambda iADD}(m)=\hat{P}_{\lambda iDROP}(m)+IL_{\lambda iDROP}+IL_{\lambda iADD}-IL_{((\lambda 1, \lambda 2, ... \lambda n)-\lambda i)THROUGH}$$

where all channel $\lambda_1, \lambda_2, ... \lambda_n$ power levels are in dB, and where $\alpha$ is a tracking parameter that determines certain properties of the algorithm. As will be appreciated, this algorithm implements a unity gain low pass filter in the Z-plane. Thus, the reference output power of the APC loop should be $\hat{P}_{\lambda iADD}$. However, in order to take into account network 115 level control, the output reference power from the optical attenuator 114 should be:

$$P_{\lambda iREF}=\hat{P}_{\lambda iADD}+\epsilon_{NET}(k) \text{ in } dB$$

where $\epsilon_{NET}$ is a network 115 level gain equalization control message that is sent via the optical telemetry channel 122 after processing of WADM 108 terminal i, and k is the number of the corrective message being sent. NET is initially set to zero. Then, whenever a corrective message is received by the telemetry system, $\epsilon_{NET}$ is updated as follows:

$$\epsilon_{NET}(0)=(0);$$

$$\epsilon_{NET}(k)=\beta \times \epsilon_{NET}(k-1)+(1-\beta) \times \Delta P_i(k), 0 \leq \beta \leq 1$$

where $\beta$ is a tracking parameter that helps establish network 115 level convergence properties of the algorithm. Thus, this algorithm also implements a unity gain low pass filter in the Z-plane.

Abnormal operations that might occur and affect the gain equalization process include loss of $P_{\lambda iDROP}$, due, for example, to fiber cuts, remote transmitter failure and the like. In such cases, the algorithm will stop updating $P_{\lambda iDROP}$, since $P_{\lambda iDROP}$ is no longer valid. The algorithm will continue channel i attenuator 114 control and use the last valid value for $\hat{P}_{\lambda iADD}$ when calculating $P_{\lambda iREF}$. Control based upon $P_{\lambda iDROP}$ will resume when $\lambda_{iDROP}$ is again available. An initial value for $\hat{P}_{\lambda iADD}$ should be defined, in case there is no dropped channel during power up.

Abnormal operations that might occur and affect the gain equalization process also include loss of $P_{\lambda iIN}$, due, for example, to local transmitter 112 failure or the like. In such cases, the algorithm continues to update $\hat{P}_{\lambda iADD}$ and $P_{\lambda iREF}$, but ignores further telemetry messages and stops adjusting the attenuator 114. Again, control resumes when $\lambda_{iIN}$ is again available.

Abnormal operations that might occur and affect the gain equalization process also include loss of $P_{\lambda iADD}$, due, for example, to attenuator 114 failure, monitor failure, or the like. In such cases, the algorithm continues to update the above equations, but ignores further telemetry messages. Again, the algorithm stops adjusting the attenuator 114. Control resumes when $\lambda_{iADD}$ is again available.

What is claimed is:

1. A method for gain equalization in a WDM network, comprising:

measuring the strength of a previously dropped optical channel before said channel is added back to said network;

determining a desired strength for said optical channel to be added back to said network; and in response to a difference between the measured strength of said optical channel and the determined desired strength for said optical channel, adjusting the power of said optical channel in a manner tending to cause the strength of said optical channel to approach said determined desired strength for said optical channel, the power of said optical channel being adjusted prior to adding said optical channel back to said network.

2. The method of claim 1, wherein said adjustment is performed automatically via an automatic power control (APC) loop.

3. The method of claim 1, wherein said desired strength for said optical channel is substantially equal to the power of said optical channel when dropped from the network.

4. The method of claim 3, wherein the power of said optical channel is adjusted via an attenuator.

5. The method of claim 1, wherein the strength of said optical channel comprises the power of said optical channel.

6. The method of claim 1, wherein the strength of said optical channel comprises the optical signal to noise ratio (OSNR) of said optical channel.

7. The method of claim 1, wherein the determined desired strength for said optical channel comprises the average power of all of the other active optical channels in said network.

8. The method of claim 1, wherein the determined desired strength for said optical channel comprises a target power.

9. The method of claim 8, wherein said target power is determined according to the equation:

$$P_{iTARGET} = P_i + \lambda(P_{AVERAGE} - P_i),$$

wherein $P_i$ is the power of an optical channel in question, $P_{AVERAGE}$ is equal to the average power of all of the other active optical channels in said network, and $\lambda$ is convergence parameter.

10. The method of claim 91, wherein $\lambda$ has a value substantially equal to $0.25 \leq \lambda \leq 0.75$.

11. The method of claim 9, wherein the power of said optical channel is adjusted according to the equation:

$$\Delta P_i = 10 \times \log(P_{iTARGET}/P_i).$$

12. The method of claim 9, further comprising:
if an optical channel in said network is not received at the output of said network, eliminating the power value of the undetected optical channel(s) in the calculation of $P_{AVERAGE}$.

13. The method of claim 1, wherein said method is performed for each active channel of said network.

14. The method of claim 13, wherein each channel of said network is added and dropped by an individual add/drop device of said network.

15. The method of claim 14, wherein said add/drop device comprises a wavelength add/drop multiplexer (WADM).

16. The method of claim 14, wherein said add/drop device comprises an optical add/drop module (OADM).

17. The method of claim 1, wherein the strength of said optical channel is adjusted via an attenuator.

18. The method of claim 1, further comprising:
measuring the strength of said adjusted optical channel after being added to said network;
determining a desired strength for said adjusted optical channel; and
in response to a difference between the measured strength of said adjusted optical channel and the determined desired strength for said adjusted optical channel, once again adjusting the power of said adjusted optical channel in a manner tending to cause the strength of said twice adjusted optical channel to approach said determined desired strength for said optical channel.

19. A system for gain equalization in a WDM network, comprising:
at least one power measurement device for measuring the strength of a previously dropped optical channel before said optical channel is added back to said network;
a controller adapted to determine a desired strength for said optical channel to be added back to said network, and, in response to a difference between the measured strength of said optical channel and the determined desired strength for said optical channel, to generate a control signal suitable for adjusting the power of said optical channel, in a manner tending to cause the strength of said optical channel, to approach said determined desired strength; and
at least one power control device, wherein, in response to said control signal, said at least one power control device adjusts the power of said optical channel in a manner tending to cause the strength of said optical channel to approach said determined desired strength, the power of said optical channel being adjusted prior to adding said optical channel back to said network.

20. The system of claim 19, comprising a respective power control device for each optical channel in said network wherein, in response to a received respective control signal, said respective power control devices adjust the power of each of said respective optical channels in a manner tending to cause the strength of said optical channels to approach a respective determined desired strength, the power of each of said optical channels being respectively adjusted prior to adding said optical channels back to said network, said optical channels having been previously dropped from said network.

21. The system of claim 19, further comprising an automatic power control (APC) loop for automatically adjusting said at least one power control device in response to respective control signals from said at least one power measurement device.

22. The system of claim 19, wherein said at least one power measurement device comprises an optional power meter.

23. The system of claim 19, wherein said controller communicates said generated control signal to said at least one power control device via a telemetry link.

24. The system of claim 19, wherein said at least one power control device comprises an attenuator.

25. The system of claim 19, wherein the strength of said optical channel comprises the power of said optical channel.

26. The system of claim 19, wherein the strength of said optical channel comprises the optical signal to noise ratio (OSNR) of said optical channel.

27. The system of claim 19, wherein the determined desired strength for said optical channel comprises the average power of all active optical channels in said network.

28. The system of claim 19, wherein the determined desired strength for said optical channel comprises a target power.

29. The system of claim 28, wherein said target power for said optical channel is determined according to the equation:

$$P_{iTARGET} = P_i + \lambda(P_{AVERAGE} + P_i),$$

wherein $P_i$ is the power of an optical channel in question, $P_{AVERAGE}$ is equal to the average power of all other active optical channels in said network, and $\lambda$ is a convergence parameter.

30. The system of claim 29, wherein $\lambda$ has a value substantially equal to $0.25 \leq \lambda \leq 0.75$.

31. The system of claim 29, wherein the power of said optical channel is adjusted according to the equation:

$$\Delta P_i = 10 \times \log(P_{iTARGET}/P_i).$$

32. The system of claim 29, further comprising:
if an optical channel in said network is not received at the output of said network, eliminating the power value of the undetected optical channel(s) in the calculation of $P_{AVERAGE}$.

33. The system of claim 19, further comprising:
at least one optical add/drop device adapted to drop a respective optical channel from said network, to pass through all other optical channels, and to add said respective optical channel back to said network,
wherein a respective power control device is located within a respective at least one optical add/drop device.

34. The system of claim 33, comprising a respective optical add/drop device for each optical channel in said network, each of said optical add drop devices adapted to drop a respective optical channel from said network, to pass through all other optical channels, and to add said respective optical channel back to said network,
wherein said at least one power control device is located within said respective optical add/drop devices.

35. The system of claim 33, further comprising an automatic power control (APC) loop for automatically adjusting said at least one power control device.

36. The system claim 33, wherein of said at least one power control device comprises an attenuator.

37. The system of claim 19, wherein said desired strength for said optical channel is substantially equal to the power of said optical channel when dropped from the network.

38. A WDM network, comprising:
   a plurality of transmitters for providing optical channels to said WDM network;
   a multiplexer for combining the optical channels from said transmitters;
   at least one amplifier for amplifying the combined optical channels;
   at least one optical add/drop device adapted to drop a respective optical channel from said network, to pass through all other optical channels, and to add said respective optical channel back to said network;
   a demultiplexer for separating and receiving said optical channels; and
   a system for gain equalization in said WDM network including:
      at least one power measurement device for measuring the strength of received previously dropped optical channels before said optical channels are added back to said network;
      a controller adapted to determine a desired strength for each of said received optical channels to be added back to said network, and, in response to a difference between the measured strength of each of said received optical channels and a respective determined desired strength for each of said optical channels to generate a respective control signal suitable for adjusting the power of a respective one of each of said optical channels in a manner tending to cause the strength of each said optical channels to approach said respective determined desired strength; and
      at least one power control device, wherein, in response to a received respective control signal, said at least one power control device adjusts the power of a respective optical channel in a manner tending to cause the strength of said optical channel to approach said respective determined desired strength, the power of said respective optical channel being adjusted prior to adding said optical channel back to said network.

39. The network of claim 38, comprising a respective power control device for each of said optical channels wherein, in response to a received respective control signal, said respective power control devices adjust the power of each of said respective optical channels in a manner tending to cause the strength of said optical channels to approach said respective determined desired strength, the power of each of said optical channels being respectively adjusted prior to adding said optical channels back to said network, said optical channels having been previously dropped from said network.

40. The network of claim 38, further comprising an automatic power control (APC) loop for automatically a adjusting said at least one power control device in response to the respective control signals from said controller.

41. The network of claim 38, wherein said power measurement device comprises an optical power meter.

42. The network of claim 38, wherein said controller communicates said generated control signals to said at least one power control device via a telemetry link.

43. The network of claim 38, wherein said at least one power control device comprises an attenuator.

44. The network of claim 38, wherein the strength of each of said optical channels comprises the power of each of said optical channels.

45. The network of claim 38, wherein the strength of each of said optical channels comprises the optical signal to noise ratio (OSNR) of each of said optical channels.

46. The network of claim 38, wherein the determined desired strength for each of said comprises the average power of all of the active optical channels network.

47. The network of claim 38, wherein the determined desired strength for each of said optical channels comprises a target power.

48. The network of claim 38, comprises a respective optical add/drop device for each of said optical channels, each of said optical add drop devices adapted to drop a respective optical channel from said network, to located pass through all other optical channels, and to add said respective optical, channel back to said network,
   wherein said at least one power control device within said respective optical add/drop devices.

49. The network of claim 38, wherein in response to a difference between the strength of an optical channel when dropped from the network and the strength of said optical channel when being added back to the network, a respective power control device is adjusted prior to adding said optical channel back to the network such that the strength of said optical channel when being added back to the network is substantially equal to the power of said optical channel when dropped from the network.

* * * * *